(No Model.)
E. GLEASON.
PHOTOGRAPHIC CAMERA.
No. 565,204. Patented Aug. 4, 1896.
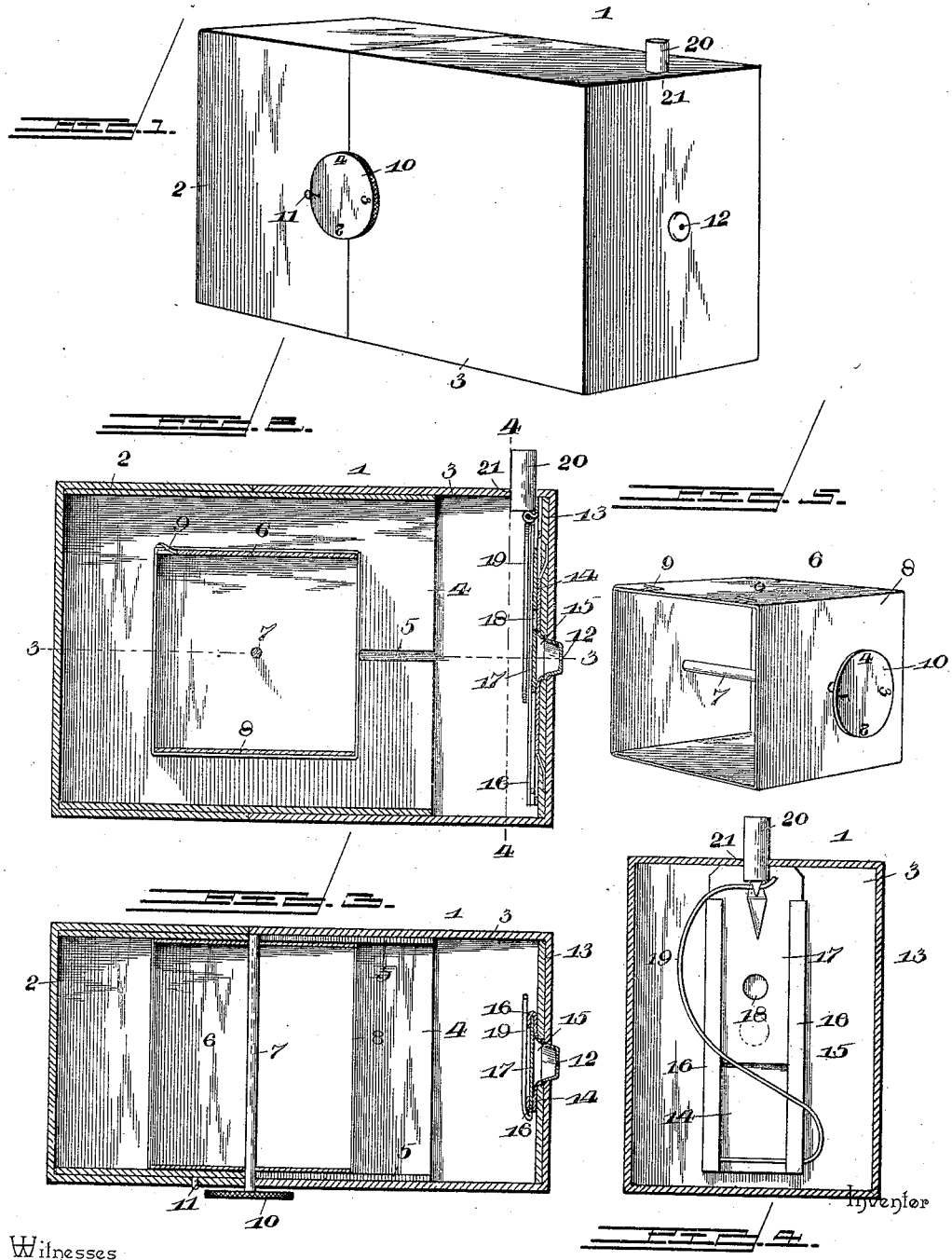
Witnesses
Wm E. Doyle
L. P. Nothaup 3d
By his Attorneys, Eugene Gleason,
C. A. Snow & Co.
THE NORRIS PETERS CO., PHOTO-LITHO., WASHINGTON, D. C.

UNITED STATES PATENT OFFICE.

EUGENE GLEASON, OF ONALASKA, WISCONSIN.

PHOTOGRAPHIC CAMERA.

SPECIFICATION forming part of Letters Patent No. 565,204, dated August 4, 1896.

Application filed November 14, 1895. Serial No. 568,943. (No model.)

*To all whom it may concern:*

Be it known that I, EUGENE GLEASON, a citizen of the United States, residing at Onalaska, in the county of La Crosse and State of Wisconsin, have invented a new and useful Pocket-Camera, of which the following is a specification.

This invention relates to photographic cameras, and it has for its object to provide a new and useful pocket-camera that shall be extremely simple in construction, while thoroughly effective in operation to take pictures.

To this end the main and primary object of the present invention is to construct a camera on the "pin-hole" principle and of such a size as to be capable of being conveniently carried around in the pocket and at the same time to be easily held and manipulated by one hand, thereby providing a very effective "secret" or "detective" camera.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a pocket-camera constructed in accordance with this invention. Fig. 2 is a central longitudinal sectional view thereof. Fig. 3 is a sectional view on the line 3 3 of Fig. 2. Fig. 4 is a transverse sectional view on the line 4 4 of Fig. 2, illustrating the shutter mechanism. Fig. 5 is a perspective view of the revolving film-holder.

Referring to the accompanying drawings, 1 designates a sectional two-part camera-box, consisting of the separate box-sections 2 and 3, respectively, which, when fitted together, form a complete light-proof box, within which are arranged all the necessary appurtenances for taking a picture. The box-section 2 is closed at one end and is provided opposite its closed end with a reduced flange extension 4, which snugly fits within the open end of the box-section 3, so that when the two box-sections are fitted together the outside surfaces thereof will lie perfectly flush and leave no projecting edges. The reduced flange extension 4 of the box-section 2 is provided in diametrically opposite sides with the bearing-notches 5, which removably receive the spindle extremities of a film-holder 6. The film-holder 6 essentially consists of a rotating spindle 7 and a skeleton polygonal metallic frame 8, fitted on the spindle. The skeleton polygonal metallic frame 8 is illustrated as being rectangular, so that when a sensitized photographic film is wrapped in one direction around said frame one revolution of the latter will present four sides of the film toward the closed end of the box-section 3, so that four pictures may be taken, but it will of course be understood that by making the frame 8 pentagonal, &c., five or more sides of a film will be presented for exposure by one complete revolution of the frame 8.

The metallic film-holding frame 8 is provided at suitable points with catch-prongs 9, which are engaged in the film that is wrapped around the frame 8 to properly hold the film in place while the same is within the camerabox, it being understood that by disengaging the film from such prongs the same may be readily removed from the holder when it is desired to develop the exposed film. The rotating spindle 7 of the film-holder is adapted to have its extremities readily slide in and out of the notches 5, so that the holder may be readily removed and replaced, and one extremity of the spindle has fitted thereon outside of the box a dial-disk 10, on the outer face of which are placed numbers corresponding to the number of film-exposing sides of the frame 8, and which numbers are adapted to be turned opposite an index-point 11, fitted to one side of the box-section 2, so as to indicate the number of exposures, and also to act as a guide in setting the holder for a new exposure.

The box-section 3 is provided in its closed end directly beyond the film-holder within the box-section 2 with a focus-opening 12, which is preferably the ordinary pin-hole opening commonly employed in "pin-hole" photography. Removably fitted within the said closed end of the box-section 3 is a shutter-carrying strip of pasteboard, or the like, 13, which is cut in a size to fit the interior of the box-section 3 snugly, and which is adapted to be readily removed when repairing or replacing of the shutter is necessary. The removable shutter-carrying strip 13 has secured to its inner side the guide-plate 14, provided with a shutter-opening 15, alining with the focus-opening 12, and at its opposite side edges with the inturned guide-flanges 16, which loosely embrace the opposite side edges of the sliding shutter-plate 17. The sliding shutter-plate 17 is also provided with an opening 18 therein, adapted to be thrown into and out of alinement with the shutter-opening 15 of the plate 14. The plate 17 has suitably connected to one end thereof one end of a bowed spring 19, the other end of which is suitably attached to one end of the guide-plate 14 and normally holds the sliding shutter-plate in a position with its opening out of alinement with the shutter-opening, thereby closing the focus-opening of the camera-box. The sliding shutter-plate 17 has attached to the same end thereof as the spring 19 the push-button 20, which works through the button-opening 21 in one side of the box-section 3, and is normally projected through said opening by the action of the spring 19.

The position of the button 20 in the opening 21 primarily provides for holding the removable shutter-carrying strip 13 in place, so that when the push-button is depressed entirely out of the opening 21 the strip 13 and the shutter fitted thereto can be readily removed from the box.

In manipulating the camera, it is simply necessary to adjust the film-carrying holder and then depress the push-button 20 to provide for focusing an image on the film and thereby take a picture, and this operation can be repeated until the film is exhausted, after which the exposed film is removed for developing and the holder "reloaded."

Changes in the form, proportion, and the minor details of construction may be resorted to without departing from the principle or sacrificing any of the advantages of this invention.

Having thus described the invention, what is claimed, and desired to be secured by Letters Patent, is—

1. In a camera, a separable camera-box comprising two box-sections one of which is provided at its open end with a reduced flange extension detachably and slidably fitting within the open end of the other box-section, said flange extension being provided in diametrically opposite sides with bearing-notches, a rotary film-holder having a spindle whose extremities removably fit in said bearing-notches and are held therein by the box-section fitting over said flange extension, and shutter mechanism arranged within one end of the box, substantially as set forth.

2. In a camera, the box provided in one end with a focus-opening and in one side with a button-opening, a separate shutter-carrying strip 13 snugly registering within the box and detachably fitted therein flat against the end having the focus-opening, said strip 13 having suitable guides, and a spring-adjusted shutter-plate slidably mounted in the guides of the strip 13, and provided at one end with a push-button working in the button-opening of the box and serving to detachably retain the shutter-carrying strip 13 in place, the entire disengagement of the button from the button-opening permitting the shutter-carrying strip and shutter mechanism to be removed from the box, substantially as described.

In testimony that I claim the foregoing as my own I have hereto affixed my signature in the presence of two witnesses.

EUGENE GLEASON.

Witnesses:
S. P. NORTH,
H. J. KNOWLES.